United States Patent
Hsu et al.

(10) Patent No.: US 7,884,899 B2
(45) Date of Patent: Feb. 8, 2011

(54) SYSTEM FOR DISPLAYING IMAGES AND METHOD WITH A PERIPHERAL REGION HAVING A MOSAIC COLOR FILTER PATTERN THEREON THAT HAS PILLARS AND CHANNELS AND AN OPENING ALONG ITS BOUNDARY

(75) Inventors: Yao-Pin Hsu, Taichung (TW); Chi-Wen Peng, Miaoli County (TW); Cheng-Hsin Chen, Changhua County (TW); Jr-Hong Chen, Hsinchu County (TW)

(73) Assignee: TPO Displays Corp., Miao-Li County (TW)

( * ) Notice: Subject to any disclaimer, the term of this patent is extended or adjusted under 35 U.S.C. 154(b) by 1021 days.

(21) Appl. No.: 11/670,549

(22) Filed: Feb. 2, 2007

(65) Prior Publication Data
US 2008/0186454 A1   Aug. 7, 2008

(51) Int. Cl.
*G02F 1/1335* (2006.01)
(52) U.S. Cl. .................. 349/106; 349/156; 349/157
(58) Field of Classification Search ......... 349/153–157, 349/190, 106–109, 187
See application file for complete search history.

(56) References Cited

U.S. PATENT DOCUMENTS

| 5,617,230 | A |   | 4/1997 | Ohgawara et al. |
| 5,699,135 | A | * | 12/1997 | Hisatake et al. ............. 349/113 |
| 5,936,694 | A |   | 8/1999 | Suzuki et al. |
| 2003/0160916 | A1 |   | 8/2003 | Nakagawa et al. |
| 2005/0117093 | A1 | * | 6/2005 | Kim et al. ................... 349/106 |

FOREIGN PATENT DOCUMENTS

CN   1624548   6/2005

OTHER PUBLICATIONS

EP Search Report mailed May 20, 2008.
Chinese language office action dated Jul. 13, 2010.
English language translation of abstract of CN 1624548 (published Jun. 8, 2005).

* cited by examiner

*Primary Examiner*—John Heyman
(74) *Attorney, Agent, or Firm*—Thomas, Kayden, Horstemeyer & Risley

(57) ABSTRACT

Systems for displaying images and methods for fabricating the same. A representative system includes a substrate having a display region and a peripheral region, and a mosaic color filter pattern formed in the peripheral region. The mosaic color filter pattern includes a plurality of separated pillars and a plurality of channels adjacent to the pillars. Specifically the volume ratio between the pillars and the channel is 1:5 to 2:1, preferably 1:3 to 1:1.

11 Claims, 6 Drawing Sheets

SYSTEM FOR DISPLAYING IMAGES AND METHOD WITH A PERIPHERAL REGION HAVING A MOSAIC COLOR FILTER PATTERN THEREON THAT HAS PILLARS AND CHANNELS AND AN OPENING ALONG ITS BOUNDARY

BACKGROUND OF THE INVENTION

1. Field of the Invention

The invention relates to the display of images with the use of mosaic color filter patterns.

2. Description of the Related Art

The demand for full-color flat panel displays has been increasing rapidly in recent years in conjunction with the advances being made in personal computers in general and portable personal electrical products in particular. In responding to this demand, high priority is now being given to establishing means for supplying such displays at reasonable cost.

In order to provide full-color imaging, a color filter (CF) is applied. For example, in a liquid crystal device (LCD), the color filter is disposed on a display screen to alter the emitting light passing therethrough.

A number of methods are known conventionally for manufacturing RGB color filter arrays. Among them, photolithography processes provide advantages of high yield and efficiency, making such an industry choice. In such a process, red, green, and blue photosensitive compositions are coated on a substrate by spin coating. The coatings are then etched to form red, green, and blue color filter patterns on predetermined regions of the substrate. In that way, color filter arrays can be configured wherein red, green, and blue coloring layers are deployed adjacent to each other.

With this manufacturing method, the flatness of the rear color filter pattern depends on the shape of the front color filter pattern earlier formed on the substrate. For example, when the sidewall of the front color filter pattern is a discontinuous plane or has an opening, the opening interferes with the subsequent spin coating process of the rear color filter pattern. This can result in undesirable line mura defects of the full-color flat panel display employing the color filter array.

FIG. 1 is a schematic diagram depicting fabrication of a conventional color filter substrate by a spin coating process. A substrate 20 is disposed on a support 12, and a first color photoresist composition 13, provided by a dispenser 11 of a spin coater 10, is injected on the substrate 20 having a display region 22 and a peripheral region 23. After spinning the support 12 as indicated by the arrow for a few seconds, a uniform coating of the first color photoresist composition 13 is formed on the substrate 20. The coating is then patterned to form a front color filter pattern 30.

FIG. 2 is a close-up view of location L shown in FIG. 1. The front color filter pattern 30 formed on a dummy region of the peripheral region 23 has an opening 21. When forming a rear color filter pattern 40 on the display region 22, a second color photoresist composition 33 flows as indicated by the arrows over the front color filter pattern 30. Since the second color photoresist composition 33 flowing into the opening 21 of the front color filter pattern 30 is blocked by the boundary 25, a thicker rear color filter pattern 41 is formed, thereby producing an uneven rear color filter pattern 40 (comprising thicker rear color filter pattern 41 and thinner rear color filter pattern 42), further resulting in undesirable line mura defects of the full-color flat panel display. FIG. 3 is a photograph of a conventional full-color flat panel display, illustrating an example of such a line mura defect.

BRIEF SUMMARY OF THE INVENTION

Systems for displaying images and methods for fabricating the same are provided. An exemplary embodiment of such system for displaying images comprises a substrate having a display region and a peripheral region, and a mosaic color filter pattern formed in the peripheral region. The mosaic color filter pattern comprises a plurality of separated pillars and a plurality of channels adjacent to the pillars. Specifically the volume ratio between the pillars and the channels is 1:5 to 2:1, preferably 1:3 to 1:1.

An exemplary embodiment of a method of fabricating a system for displaying images comprises providing a substrate having a display region and a peripheral region, and forming a mosaic color filter pattern on the peripheral region of the substrate, wherein the mosaic color filter pattern is formed by photolithography with a mosaic shadow mask.

A detailed description is given in the following with reference to the accompanying drawings.

BRIEF DESCRIPTION OF THE DRAWINGS

The invention can be more fully understood by reading the subsequent detailed description and examples with reference made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
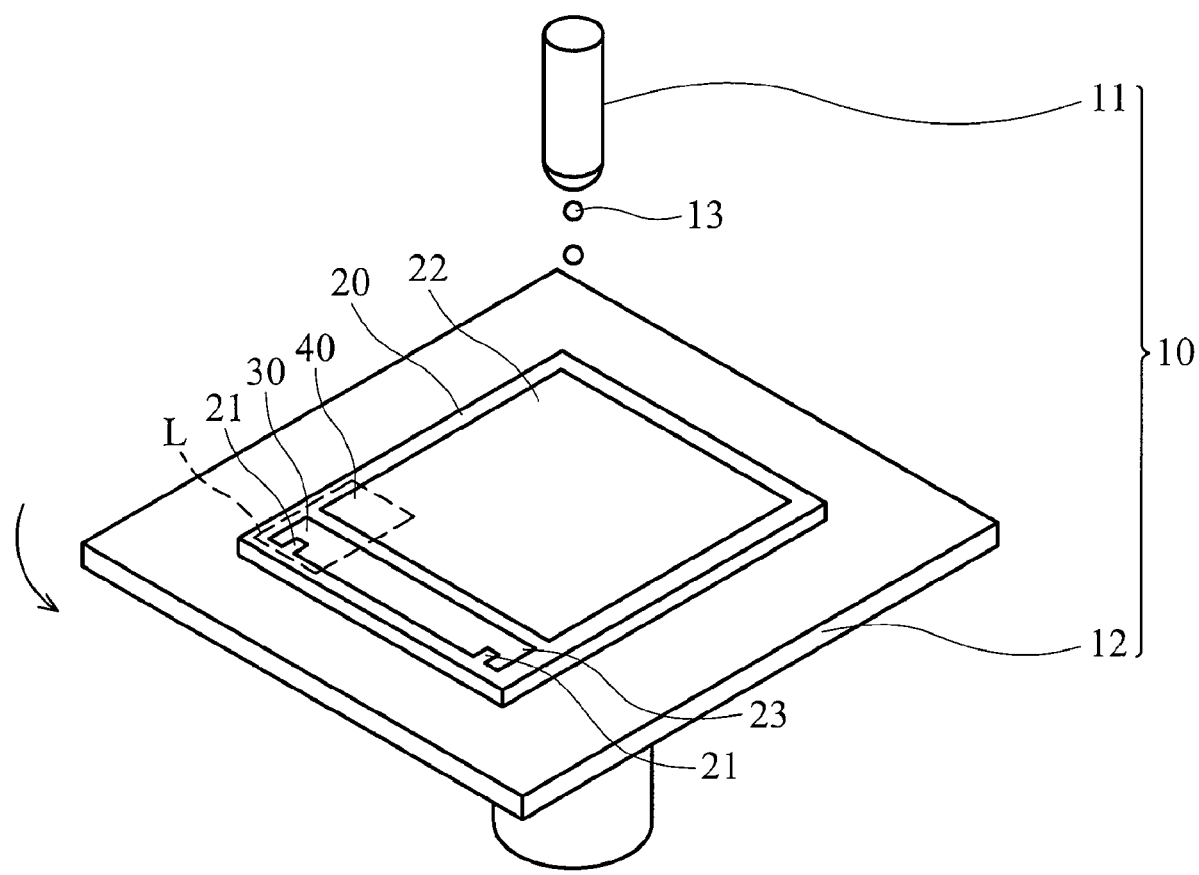
FIG. 1 is a schematic diagram for fabricating a conventional color filter substrate by a spin coating process.
Figure 2:
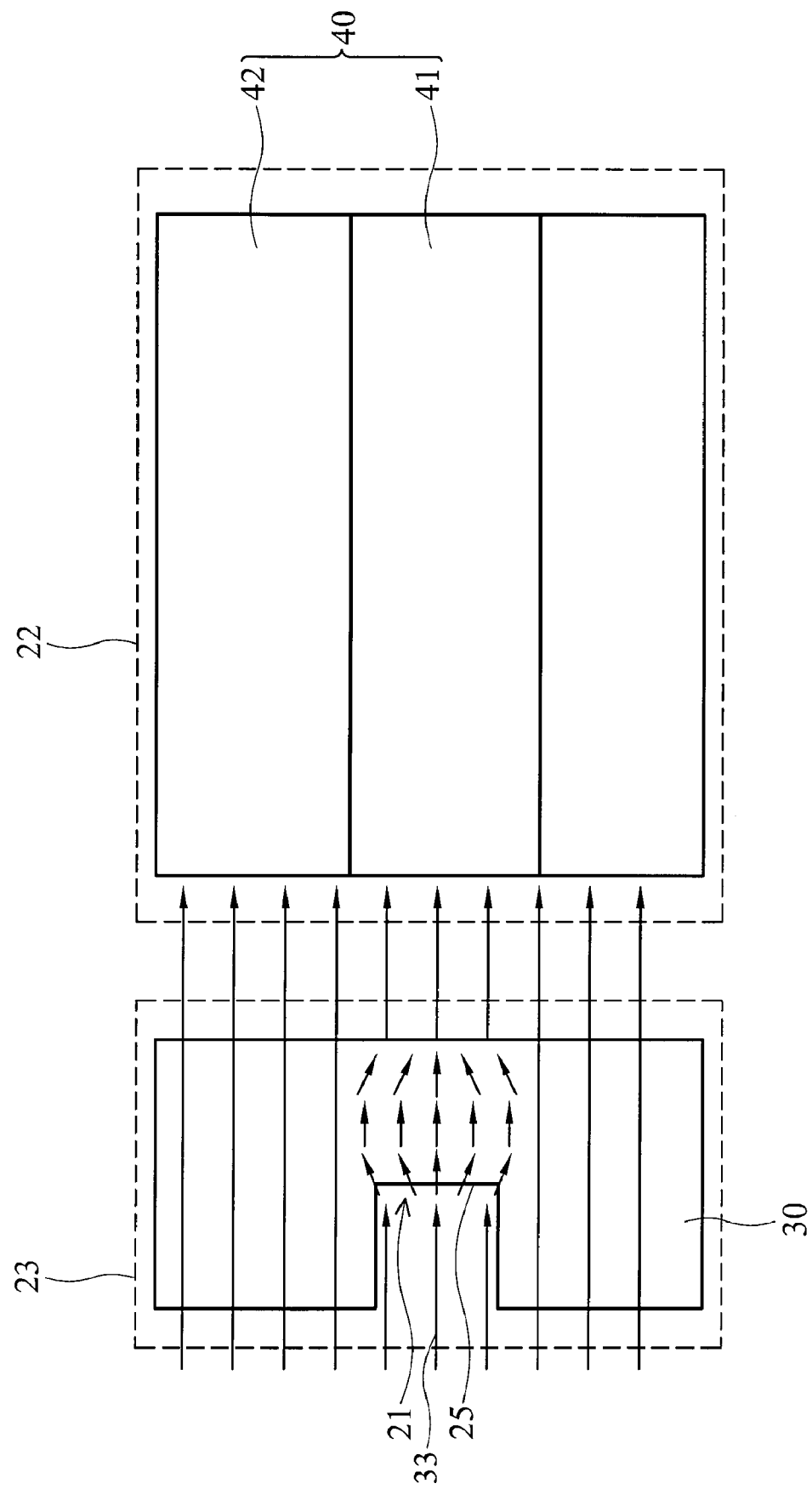
FIG. 2 is a close-up view schematic diagram of location L shown in FIG. 1
Figure 3:
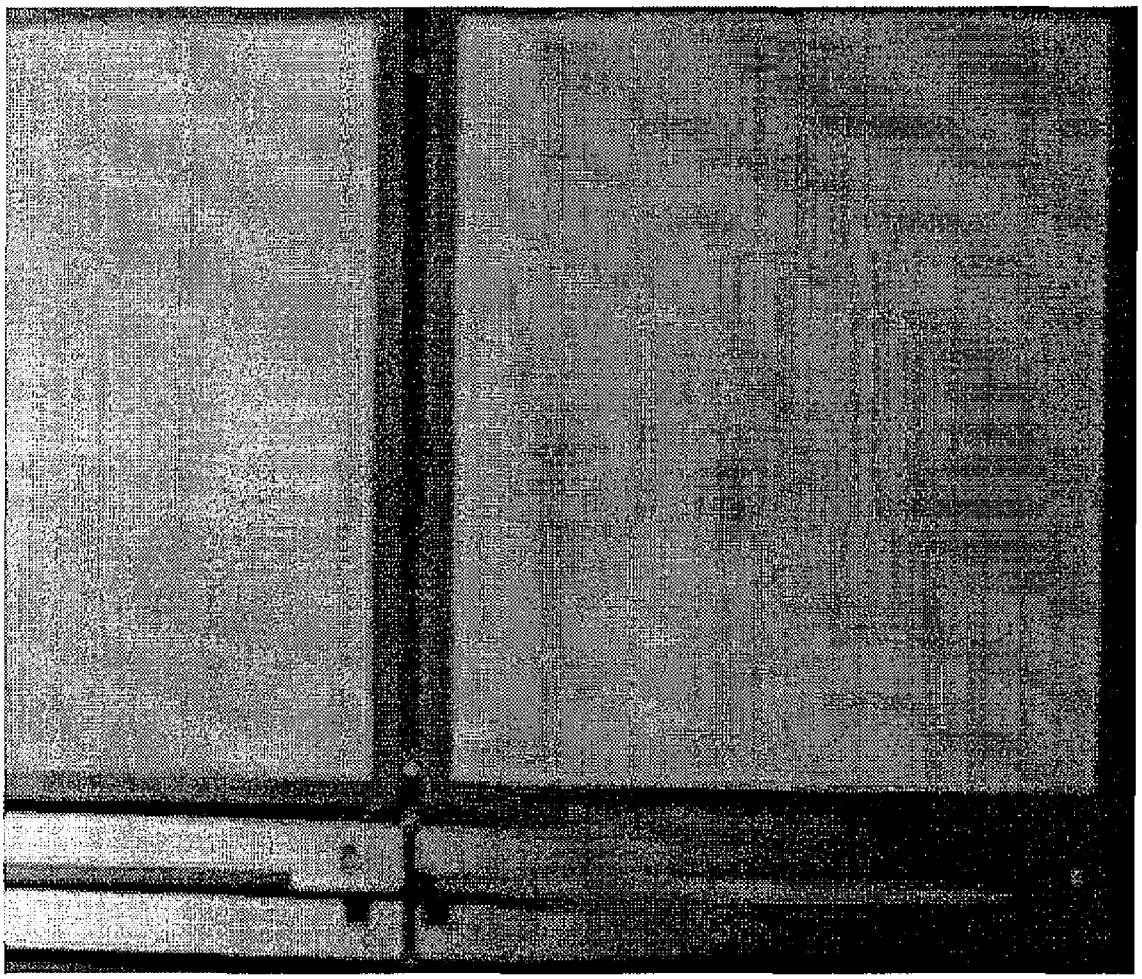
FIG. 3 is a photograph of a conventional full-color flat panel display, illustrating line mura defect.
Figure 4:
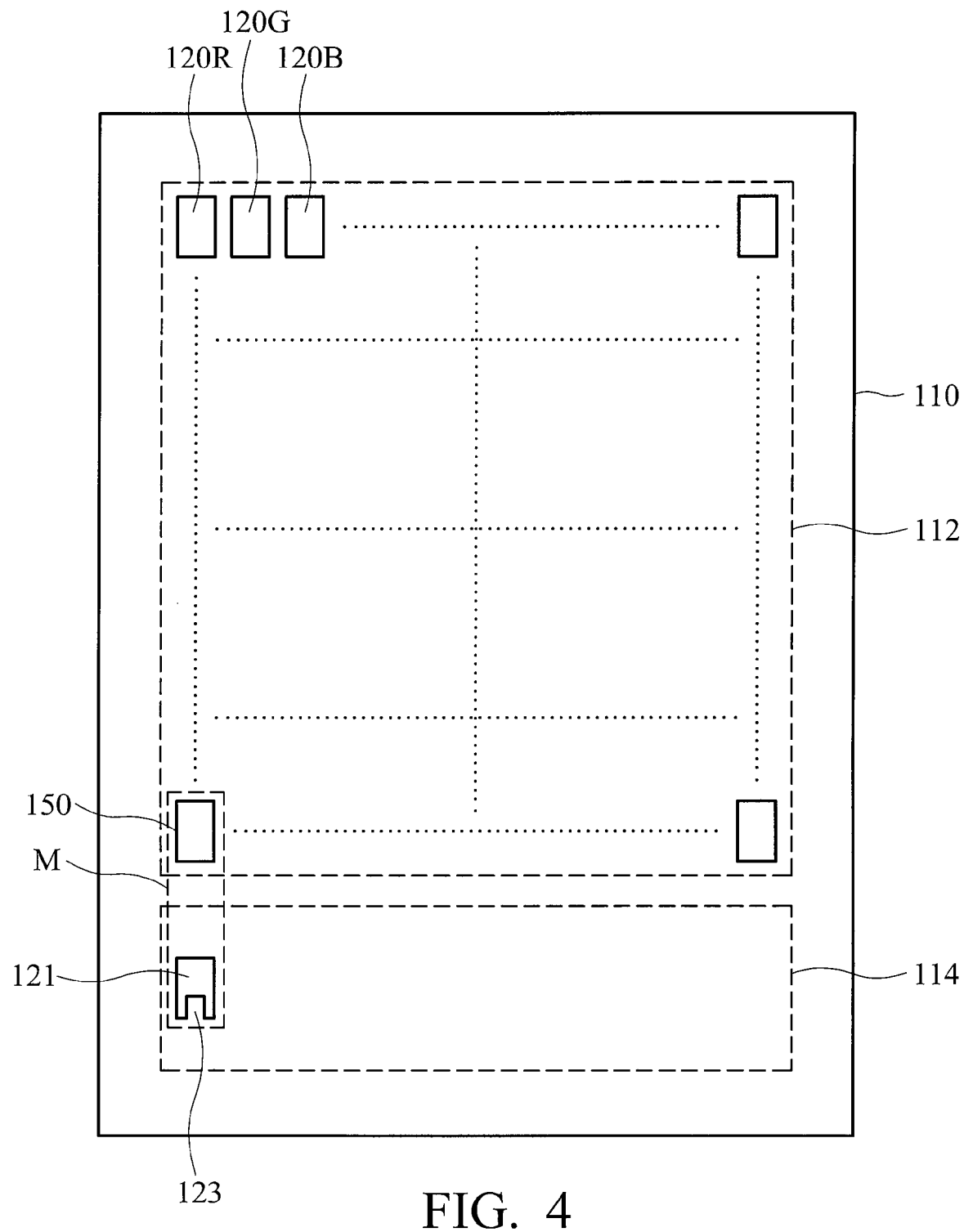
FIG. 4 is a top-view schematic diagram of the system for displaying images according to an embodiment of the invention.
Figure 5:
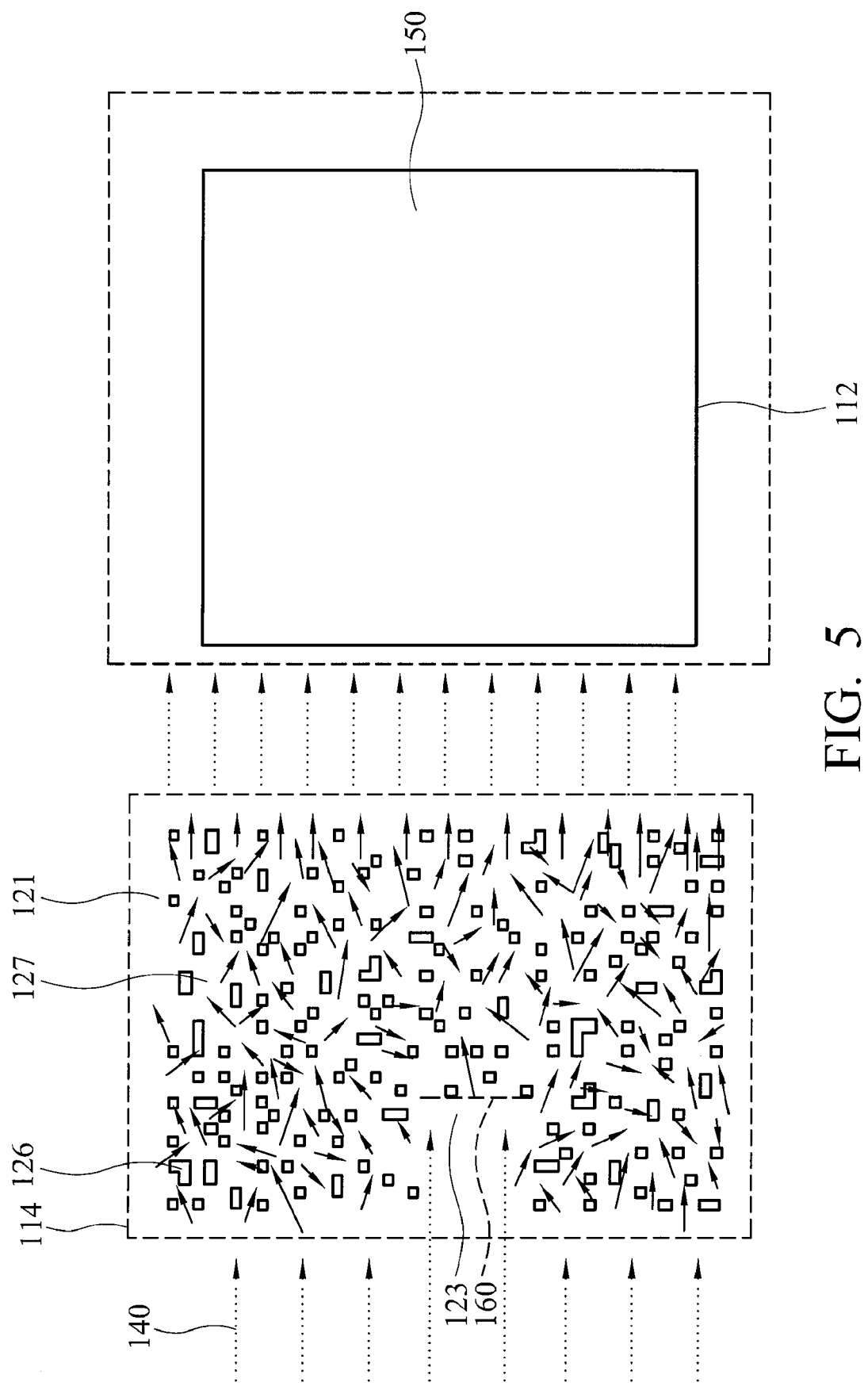
FIG. 5 is a close-up view schematic diagram of location M shown in FIG. 4.

According to an embodiment of the invention, referring to FIG. 4, the system 100 for displaying images comprises a substrate 110 having a display region 112 and a peripheral region 114. A full-color color filter pattern array comprising red color filter patterns 120R, green color filter patterns 120G, and blue color filter patterns 120B is formed on the display region 112. The peripheral region 114 has a dummy region, wherein one of the RGB color filter patterns 120R, 120G, and 120B is also formed on the dummy region. The color filter pattern formed on the dummy region comprises a mosaic color filter pattern 121 having an opening 123 serving as an alignment key or a test key. FIG. 5 is a close-up view of location M shown in FIG. 4. As shown in FIG. 5, the mosaic color filter pattern 121 formed on the dummy region comprises a plurality of separated pillars 126 and a plurality of channels 127 adjacent to the pillars 126, wherein the mosaic color filter pattern 121 is a front color filter pattern. Specifically, the volume ratio between the pillars and the channels is 1:5 to 2:1. The shapes of the pillars are unlimited, and can be cylinder shaped, square shaped or combinations thereof, for example and the dimension of the pillars is between 20 µm×20 µm and 100 µm×100 µm, for example.

When forming rear color filter patterns 150 on the display region 112 by a spin coating process, a color photoresist composition 140 flows as indicated by the arrows over the front color filter pattern. Since the front color filter pattern is a mosaic color filter pattern 121 having a plurality of channels 127 passing therethrough, the photoresist composition 140 can flow through the channels 127 to form the rear color filter patterns 150 seemingly without restriction even with the mosaic color filter pattern 121 incorporating opening 123. Due to the channels 127 of the mosaic color filter pattern 121, the color photoresist composition 140 can pass through the mosaic color filter pattern 121 to form of the rear color filter pattern 150 without the typical blocking effect being caused by the boundary 160. Therefore, the obtained rear color filter pattern 150 is relatively even film, thereby reducing or preventing a full-color flat panel display from presenting line mura defects.

In order to enable the photoresist composition 140 to pass through the mosaic color filter pattern 121 without unwanted interference, the volume ratio between the pillars and the channels can be 1:5 to 2:1, preferably 1:3 to 1:1. Further, in order to maintain the function of the mosaic color filter pattern, the volume ratio between the pillars and the channels is equal to or more than 1:3. It should be noted that the methods for forming mosaic color filter patterns are not restricted to the representative example described above. By way of example, processes suitable to use in flat display panel fabrication, such as photolithography with a mosaic shadow mask, can be used. Further, a normal color filter pattern can be formed simultaneously on the display region 112 of the substrate 110 when the mosaic color filter pattern is formed on the peripheral region 114. For example, the front color filter pattern comprising the normal color filter pattern within display region 112 and the mosaic color filter pattern within peripheral region 114 can be one of the RGB color filter patterns 120R, 120G, and 120B, and can be formed by photolithography with a shadow mask with normal patterns and mosaic patterns.

Figure 6:
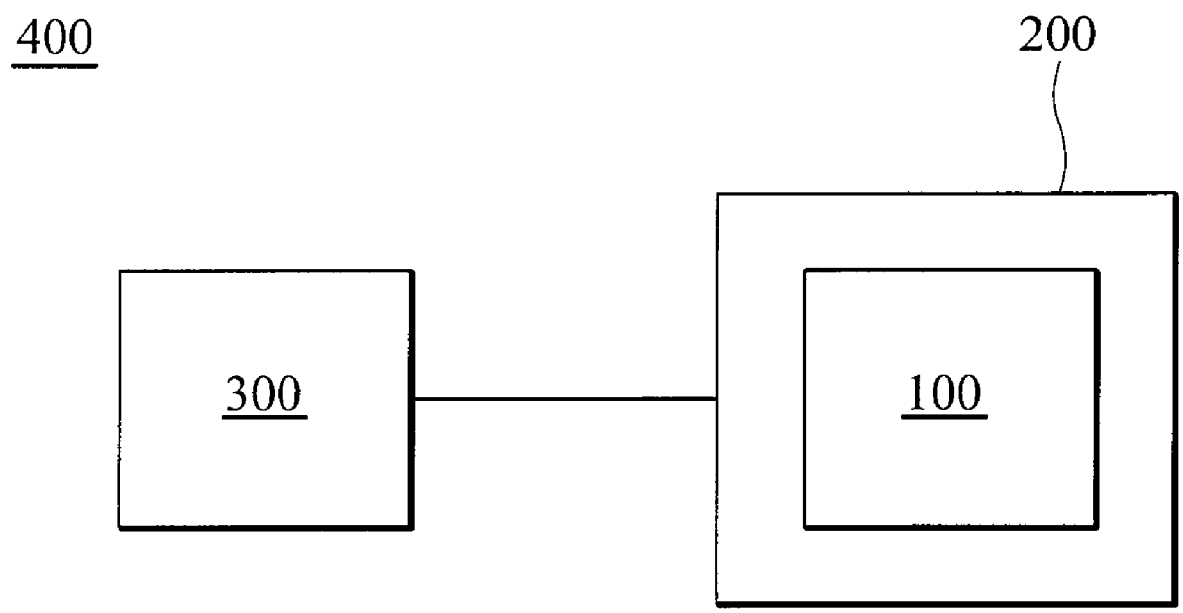
FIG. 6 schematically shows another embodiment of a system for displaying images.

FIG. 6 schematically shows another embodiment of a system for displaying images which, in this case, is implemented as a display panel 200 or an electronic device 400. The described active matrix organic electroluminescent device can be incorporated into a display panel that can be an OLED panel. As shown in FIG. 6, the display panel 200 comprises an active matrix organic electroluminescent device, such as the organic electroluminescent diode 100 shown in FIG. 4. The display panel 200 can form a portion of a variety of electronic devices (in this case, electronic device 400). Generally, the electronic device 400 can comprise the display panel 200 and an input unit 300. Further, the input unit 300 is operatively coupled to the display panel 200 and provides input signals (e.g., an image signal) to the display panel 200 to generate images. The electronic device 400 can be a mobile phone, digital camera, PDA (personal digital assistant), notebook computer, desktop computer, television, car display, or portable DVD player, for example.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for displaying images, comprising:
    a substrate having a display region and a peripheral region; and
    a mosaic color filter pattern formed in the peripheral region, comprising:
    a plurality of separated pillars; and
    a plurality of channels adjacent to the pillars, wherein the volume ratio between the pillars and the channel is 1:5 to 2:1,
    wherein an opening is located within the mosaic color filter and along a boundary of the mosaic color filter, and there is no separated pillar and channel disposed within the opening.

2. The system as claimed in claim 1, wherein the mosaic color filter pattern is formed on a dummy region.

3. The system as claimed in claim 1, wherein the opening serves as an alignment key.

4. The system as claimed in claim 1, further comprising a display panel, wherein the mosaic color filter pattern forms a portion of the display panel.

5. The system as claimed in claim 4, further comprising an electronic device, wherein the electronic device comprises:
    the display panel; and
    an input unit coupled to the display panel operative to provide input to the display panel such that the display panel displays images.

6. The system as claimed in claim 5, wherein the electronic device is a mobile phone, digital camera, PDA (personal digital assistant), notebook computer, desktop computer, television, car display, or portable DVD player.

7. A method of fabricating a system for displaying images, comprising:
    providing a substrate having a display region and a peripheral region; and
    forming a mosaic color filter pattern on the peripheral region, wherein the mosaic color filter pattern has a plurality of separated pillars and a plurality of channels adjacent to the pillars, wherein an opening is located within the mosaic color filter and along a boundary of the mosaic color filter, and there is no separated pillar and channel disposed within the opening.

8. The method as claimed in claim 7, wherein the mosaic color filter pattern is formed by photolithography with a mosaic shadow mask.

9. The method as claimed in claim 7, wherein the volume ratio between the pillars and the channel is 1:5 to 2:1.

10. The method as claimed in claim 7, wherein the mosaic color filter pattern is formed on a dummy area of the substrate.

11. The system as claimed in claim 7, wherein the opening serves as an alignment key.

* * * * *